United States Patent [19]

Rustman

[11] 4,320,491
[45] Mar. 16, 1982

[54] APPARATUS FOR VIDEO DISC STYLUS ELECTRODE RECONDITIONING

[75] Inventor: James C. Rustman, Indianapolis, Ind.

[73] Assignee: RCA Corporation, New York, N.Y.

[21] Appl. No.: 188,888

[22] Filed: Sep. 19, 1980

[51] Int. Cl.³ .......................... H04N 5/80; G11B 9/06
[52] U.S. Cl. ................................ 369/126; 369/129; 369/151; 369/71; 369/55
[58] Field of Search ................... 369/151, 126, 53, 58, 369/71, 55, 173, 129

[56] References Cited

U.S. PATENT DOCUMENTS

| | | | |
|---|---|---|---|
| 2,803,738 | 8/1957 | Glenn | 369/173 |
| 3,842,194 | 10/1974 | Clemens | 369/129 |
| 3,843,846 | 10/1974 | Miller | 369/126 |
| 4,152,641 | 5/1979 | Hughes | 369/126 |

FOREIGN PATENT DOCUMENTS 1410015 10/1975 United Kingdom ................ 369/151

OTHER PUBLICATIONS

"Technique for the rapid, accurate and strain-free machining of metallic single crystals" by Cole et al., British Journal of Applied Physics; vol. 12, Jun. 1961; pp. 296, 297.

Primary Examiner—Raymond F. Cardillo, Jr.
Assistant Examiner—Alan Faber
Attorney, Agent, or Firm—E. M. Whitacre; J. S. Tripoli; E. P. Herrmann

[57] ABSTRACT

The invention describes a method and apparatus for reconditioning a video disc signal pickup stylus electrode to prevent electrode-disc electrical shorts. An AC or DC potential is repetitively applied during a predetermined period between the stylus electrode and the disc to produce electrical breakdown at the electrode-disc interface and vaporize a portion of the electrode material. In the capacitive type video disc system, the capacitance sensing pickup circuitry is repetitively tuned to couple excessive amounts of rf potential to the stylus electrode.

11 Claims, 6 Drawing Figures

APPARATUS FOR VIDEO DISC STYLUS ELECTRODE RECONDITIONING

This invention relates to video disc player systems and in particular, to a system for removing a portion of the signal pickup stylus electrode adjacent the disc record to preclude the electrode from shorting with the disc record.

Certain types of disc record systems employ conductive discs, or discs having at least a conductive layer proximate the disc surface, wherein information is recorded in geometric variations of said conductive material. A signal pickup stylus bearing a conductive electrode is disposed proximate the disc and relative motion is created between the disc and electrode. A capacitance exists between the disc and the electrode which capacitance varies in conformance with the geometric variations moving past the electrode. Pickup circuitry coupled to the electrode converts the capacitance changes to an electrical signal.

Typically, the disc records have a thin dielectric layer on the outermost surfaces. The dielectric layer may be simply a lubricant on a conductive disc, such as General Electric's SF-1147, or may be a discrete layer of deposited material adherent to the disc such as propylene-vinyl chloride copolymer. Regardless of the type of dielectric surface, areas on the disc surface may exist where the conductive disc material penetrates the dielectric layer. These areas create the potential for the stylus electrode to short circuit with the exposed conductive disc material. Shorts of this type generally cause deleterious effects in the recovered signal.

Signal pickup styli, which have the pickup electrode adherent to a leading or trailing face thereof, which face is generally normal to the plane of the disc so that only the edge of the electrode is proximate the disc, can be fabricated so that the electrode is sufficiently removed from the shoe of the styli engaging the disc to preclude electrode-disc short circuits. However, as the styli wear, the electrodes eventually approach and contact the disc and become subject to objectionable shorting.

The present inventor realized that the shorting of the electrode and disc can be used to advantage to remove a portion of the electrode nearest the disc and thereby preclude the occurrence of further electrode-disc short circuits.

In accordance with the present invention, a spike detection circuit is included in the player to generate a control signal responsive to the occurrence of recovered signals exceeding a prescribed amplitude indicative of electrode-disc shorting. Responsive to the control signal, an AC or DC potential is selectively applied between the electrode and the disc to produce resistance heating at the end of the stylus electrode and vaporize a portion thereof adjacent the disc riding shoe of the dielectric stylus support member.

In the drawings:

FIG. 5 is a partial schematic partial block diagram of circuitry for applying a prescribed DC potential between the stylus electrode and the disc record; and FIG. 6 is a schematic diagram of a spike or level detection circuit.

Figure 1:
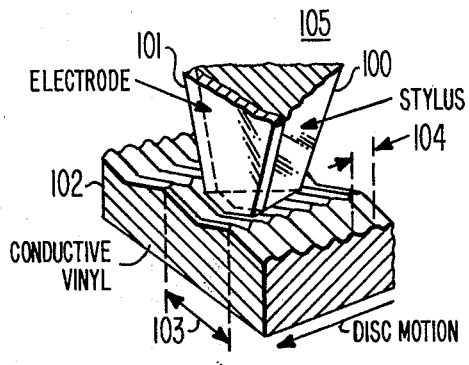
FIG. 1 is a partial perspective view of a signal pickup stylus engaging a grooved disc record.
Figure 2:
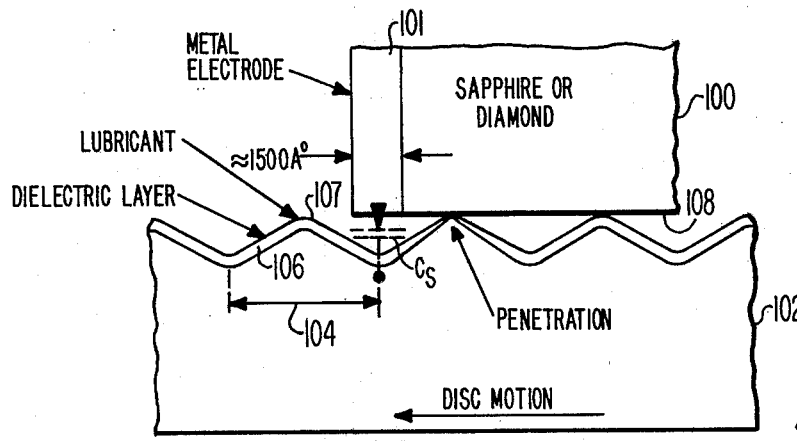
FIG. 2 is a schematic diagram of the signal pickup stylus of FIG. 1 showing the stylus-disc relationship within a record groove.

FIGS. 1 and 2 illustrate the interrelationship of a signal pickup stylus 105 and a grooved disc record 102 for recovering information recorded thereon in the form of geometric variations 104 along each groove or information track 103 located on the surface of the disc. Typically, the geometric variations 104 occur as the frequency modulation of transverse grooves or pits along the information track 103. The signal pickup stylus 105, comprising a dielectric support member 100 with a thin conductive electrode 101 on a face of the dielectric support member which is generally normal to the plane of the overall surface of the disc, is contoured to engage and track the groove 103 when relative motion is created therebetween.

The disc record 102 comprises a bulk of conductive material, the surface of which is coated with a thin dielectric layer 106. A lubricant 107 is deposited over the dielectric to lessen stylus and disc wear. In certain instances the lubricant per se provides sufficient electrical insulation to obviate a separate dielectric layer.

A capacitance $C_s$ exists between the electrode 101 and the disc 102. The capacitance changes in accordance with the geometric variations along the information track when relative velocity is created between the stylus and the disc. Signal pickup circuitry within the player and connected to the stylus electrode, responsive to the time varying capacitance changes, produces an electrical manifestation of the recorded information. However, as a result of record wear, manufacturing defects, material non-uniformity, etc., there exist areas of the disc where the conductive disc material penetrates the dielectric layer. When the stylus and consequently, the electrode 101, contacts a penetrated area, the electrode and disc undesirably short circuit producing current surges in the recovered signal which are ultimately manifested as objectionable visible images on the viewing screen. It is readily apparent that if the electrode 101 did not extend to the shoe 108 of the stylus, contact between the stylus electrode and disc could not occur and shorts would be precluded. But even if the styli were so constructed inevitably, the stylus would wear such that the base of the electrode would come into coincidence with the stylus shoe and shorts would eventually occur. At this point it would be advantageous to perform in situ, i.e., within the confines of the layer, removal of the bottommost part of the electrode to its pre-worn condition; and preferably to perform the removal automatically to minimize consumer inconvenience.

It has been found that a portion of the electrode can be removed by a technique that will be referred to as electromachining. The phenomena of the electromachining resulting in the stylus electrode removal is not precisely known but several theories predominate. Electromachining is performed by applying a potential between the electrode and the disc. The electrode being very thin, e.g., 1500 Å, and making sliding contact with the conductive bulk penetration of disc material, probably creates a high resistance at the disc-electrode interface. Current conducted between the disc-electrode interface causes resistance heating at the high resistance interface tending to vaporize the electrode. The disc is not concurrently vaporized because the point of conduction to the disc is constantly changing and the large volume of the disc conducts and dissipates the localized heat. The stylus/stylus-electrode combination on the other hand comprise a relatively small volume with relatively poor heat conduction parameters, thus, the heating remains concentrated at the bottommost portion of the electrode. The vaporization is self limiting and substantially determined by the applied potential amplitude and current limiting included in the electromachining circuitry.

A second theory of the electromachining process postulates metal removal by the electron discharge machining (EDM) process, see "Technique for the rapid accurate and strain-free machining of metallic single crystals", by M. Cole et al., British Jour. A.P., Vol. 12, June 1961, pp. 296-7. In this process the record is made negative with respect to the electrode. The stylus is effectively immersed in a dielectric fluid, i.e., the disc lubricant and does not touch the record per se but is maintained apart therefrom by the lubricant. As the electrode approaches a single groove peak, the disc-electrode spacing decreases and the field strength breaks the dielectric down causing bombardment of the electrode by a packet of electrons causing erosion of the end of the electrode. The discharge alternately terminates and reinitiates as the electrode traverses the peaks and valleys of the groove geometry until the disc-electrode separation is too large to support further discharge for the applied voltage.

A further theory on electromachining is that it occurs as a result of induced sputtering wherein the electrode is bombarded by material occurring between the disc and electrode, which is ionized by the electric field and accelerated thereby, the bombarding ions wearing away the stylus electrode bit by bit.

Figure 4:
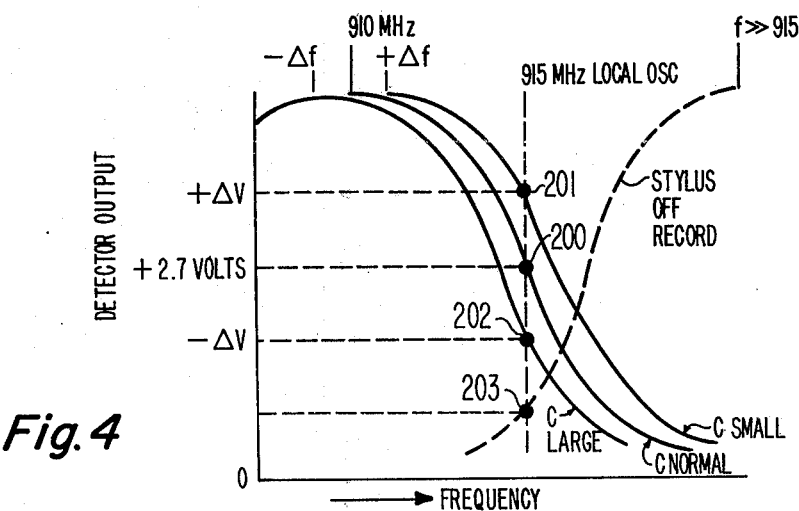
FIG. 4 is the resonance curve of the FIG. 3 pickup circuitry tuned circuit.
Figure 3:
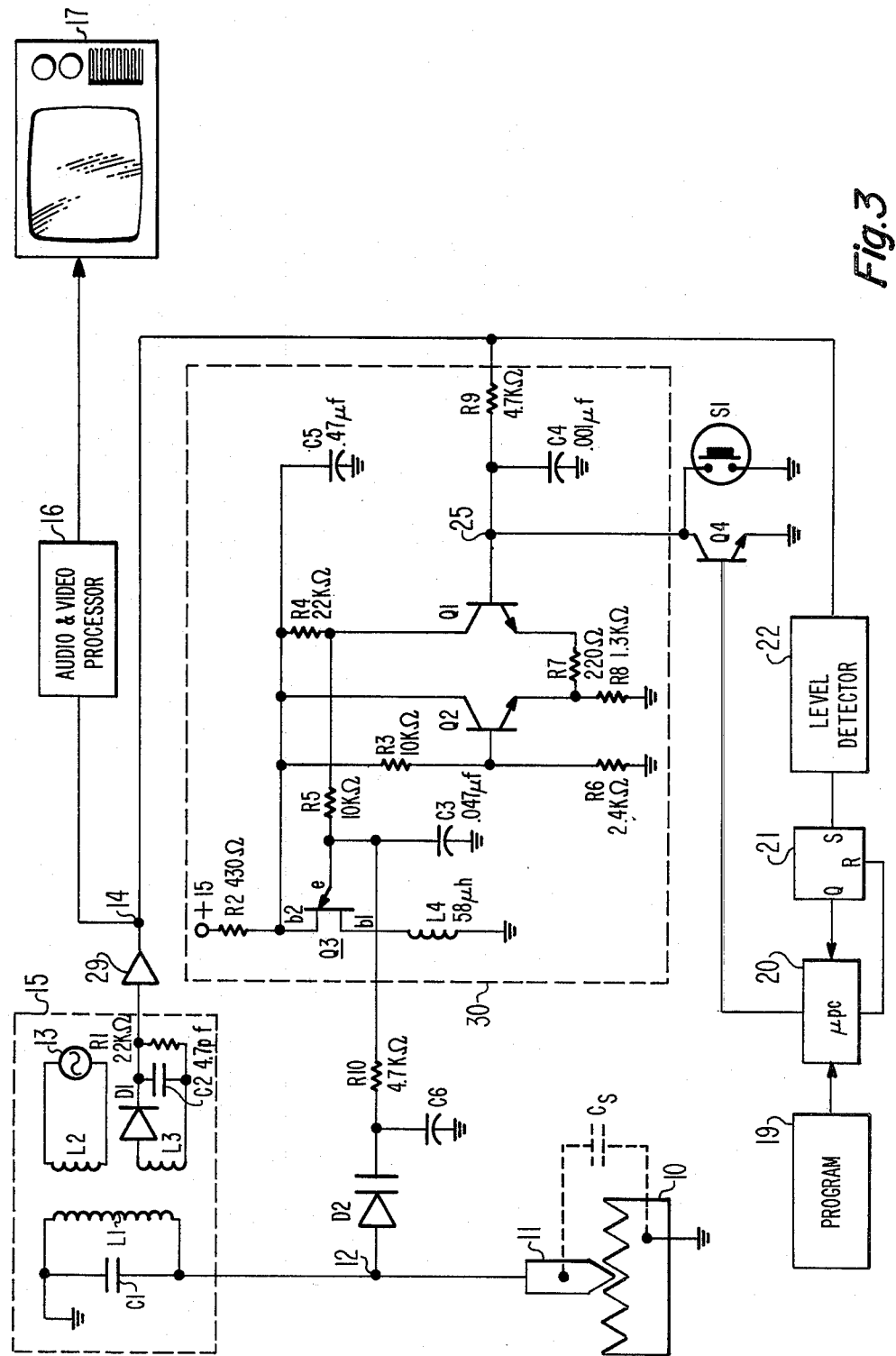
FIG. 3 is a partial block and partial schematic diagram of a video disc signal pickup circuitry and means for applying a prescribed AC potential between the stylus electrode and the disc record.

FIG. 3 illustrates circuitry for applying an AC potential between the electrode and disc sufficient to electromachine the electrode. In FIG. 3, stylus 11 with a metal electrode thereon, engages a conductive disc 10 biased to ground potential. Prerecorded signal is manifested by the time varying capacitance $C_s$ occurring between the stylus electrode and the disc. The time varying capacitance $C_s$ is converted to a time varying potential by circuitry 15. Capacitance C1, inductance L1 and capacitance $C_s$ form a resonant circuit tuned to resonate at about 910 MHz, the resonance curve being depicted in FIG. 4. A carrier signal generated by oscillator 13 having a substantially constant amplitude and frequency is loosely coupled to the tuned circuit through the inductance L2. The carrier frequency, e.g., 915 MHz, is chosen to be near the resonant frequency of the tuned circuit so that the carrier signal intercepts the amplitude-frequency characteristic at one-half of its peak value (point 200 in FIG. 4). Changes in the signal capacitance $C_s$ shift the resonance curve along the frequency axis and cause changes or a modulation in the carrier amplitude appearing across the tuned circuit. Note that as $C_s$ increases, the resonant frequency decreases shifting the curve leftward so that the 915 MHz carrier intercept occurs at point 202 and exhibits a diminished amplitude. Alternatively, if $C_s$ decreases the resonant frequency increases shifting the resonance curve rightward so that the 915 MHz carrier intercepts at point 201 and exhibits an enhanced amplitude.

The amplitude carrier appearing across the tuned circuit is coupled by inductance L3 to the conventional diode detector comprising diode D1 and the resistor R1 capacitor C2 combination. The output signal from the diode detector is a voltage manifestation of the signal recorded on the disc record including random signal spikes due to the aforementioned electrode-disc shorts, which spikes are three to five times greater in amplitude than the recovered signal. The detector output is enhanced by the preamplifier 29 having an output connection 14. The signal available at 14 is conditioned by video and audio processing circuits 16 for transmission to the antenna terminals of a standard TV receiver 17.

The stylus electrode capacitance $C_s$ is actually comprised of two components: a steady state or fringing capacitance of the order of 0.1 pF and the signal capacitance which is of the order 0.0001 pF. The fringing capacitance, due to parametric differences across a disc, or to disc wrap for example, varies at the once around rate of the turntable. These are low frequency variations relative to the signal variations. The low frequency variations are detected and averaged in circuitry 30 to develop an AFT voltage which is used to control a voltage capacitance also connected in the tuned circuit so as to maintain the resonator tuning constant with fringing capacitance variations.

In the circuit, the varactor diode D2 exhibits a voltage variable capacitance which is determined by the dc potential applied through resistor R10 to its cathode. The combination of varactor D2 serially connected with C6 is electrically in parallel connection with capacitance C1 and therefore contributes to the tuning parameters of circuitry 15 and can be seen to counteract the effects of the fringing component of the electrode-disc capacitance.

The AFT voltage is developed by first low pass filtering the recovered signal at connection 14 and comparing it against a fixed reference. Resistor R9 and capacitor C4 form a first low pass filter, the output 25 of which is applied to the comparator circuit of transistors Q1, Q2. A reference potential is generated at the base electrode of Q2 by the voltage divider formed by resistors R3 and R6. As the filtered signal at 25 increases or decreases relative to the reference potential, the potential at the collector of transistor Q1 respectively decreases or increases. This potential is filtered in a second low pass filter comprising resistor R5 and capacitor C3 which limits the frequency response to about 2 KHz. The output voltage across capacitor C3 (normally +7 V) is applied to the varactor diode D2 to control its capacitance value.

The steady state capacitance of D2 is arranged to maintain the resonator-915 MHz intercept at one-half its peak value and the signal capacitance variations shifts the resonator frequency by about ±40 KHz so that the resonator frequency does not approach the 915 MHz carrier frequency. With the resonator tuned to the carried frequency the carrier potential appearing at the stylus electrode is sufficient to cause arcing between the electrode and the disc, i.e., for the oscillator 13 output amplitude sufficient to produde an acceptable recovered signal amplitude at the output of the diode detector. This arcing is produceable whether or not the stylus electrode is shorted to the disc, i.e., in certain instances it is the result of displacement current. However, causing such arching for a continuous period tends not to produce a controllable burnback or electromachining of the electrode. On the other hand, conditioning the resonator to intermittently resonate with the carrier over a prescribed period of time (determined by electrode material, thickness and disc dielectric, etc.) results in more predictable and uniform results.

The resonator is conditioned to repeatedly resonate at the carrier frequency for a prescribed period by applying an appropriate oscillating potential to the varactor diode, preferably when the stylus is positioned at the outer extremity of the disc prior to playback or positioned at the inner disc extremity following completion of playback. Note that if the varactor capacitance is made sufficiently small, by an increase in its reverse bias potential, the resonance curve can be made to shift to the right so that the carrier intercepts the left hand skirt of the curve (e.g., point 203). In this mode the AFT feedback to the varactor is regenerative. When the carrier intercepts the left skirt a slight decrease in the varactor potential shifts the resonance leftward, increasing the output signal level and thereby the potential at the base of transistor Q1. The collector potential of Q1 consequently decreases and thereby the potential across the varactor causing a further leftward shift in resonance until the circuit passes through resonance at the carrier frequency and finally stabilizes at point 200 on the FIG. 4 curve. Varactor diode D2 is chosen so that a reversible bias of about 2 volts will shift the resonant frequency sufficiently to place the carrier intercept on the left skirt.

The varactor diode or AFT potential is caused to oscillate by the inclusion of the unijunction transistor circuit Q3 and L4 and the switch S1. Closing switch S1 turns transistor Q1 off thereby raising its collector potential to the value of the supply potential appearing across capacitance C5. The AFT potential increases as capacitor C3 charges toward the Q1 collector potential through resistor R5. When the potential across C3 reaches the emitter threshold potential of unijunction Q3, it fires discharging capacitor C3 through its emitter (e) and base (b1) circuit. When the C3 capacitor voltage approaches 1.5-2 volts, the unijunction emitter current extinguishes, permitting C3 to recharge. The AFT voltage will cycle in this manner as long as switch S1 is closed.

For every cycle of the AFT voltage the resonator goes through the 915 MHz resonance with a concomittant burnback or vaporization of the end of the stylus electrode until the electrode disc separation is too great to support breakdown for the applied potential. Thus the burnback is self limiting.

The system can be made automatic by including the transistor Q4 which is controlled by the microprocessor 20, to ground the base of Q1 and thereby initiate AFT potential oscillation. The microprocessor under program control 19 may be programmed to initiate electromachining each time a record is played or automatically only if stylus electrode-disc shorts are detected. In the latter instance, a comparator 22 receives the recovered signal at connection 14 and produces an output transition responsive to input signal amplitude occurrences exceeding the normal signal level. The comparator output signal sets as RS flip flop 21 on the occurrence of a signal spike, the flip flop storing the indication of the spike occurrence for use by the microprocessor when appropriate. Note, circuit 22 may include a counter so that it produces an output transition to the flip flop only on the occurrence of a predetermined number of signal spike incidents.

Figures 5, 6:
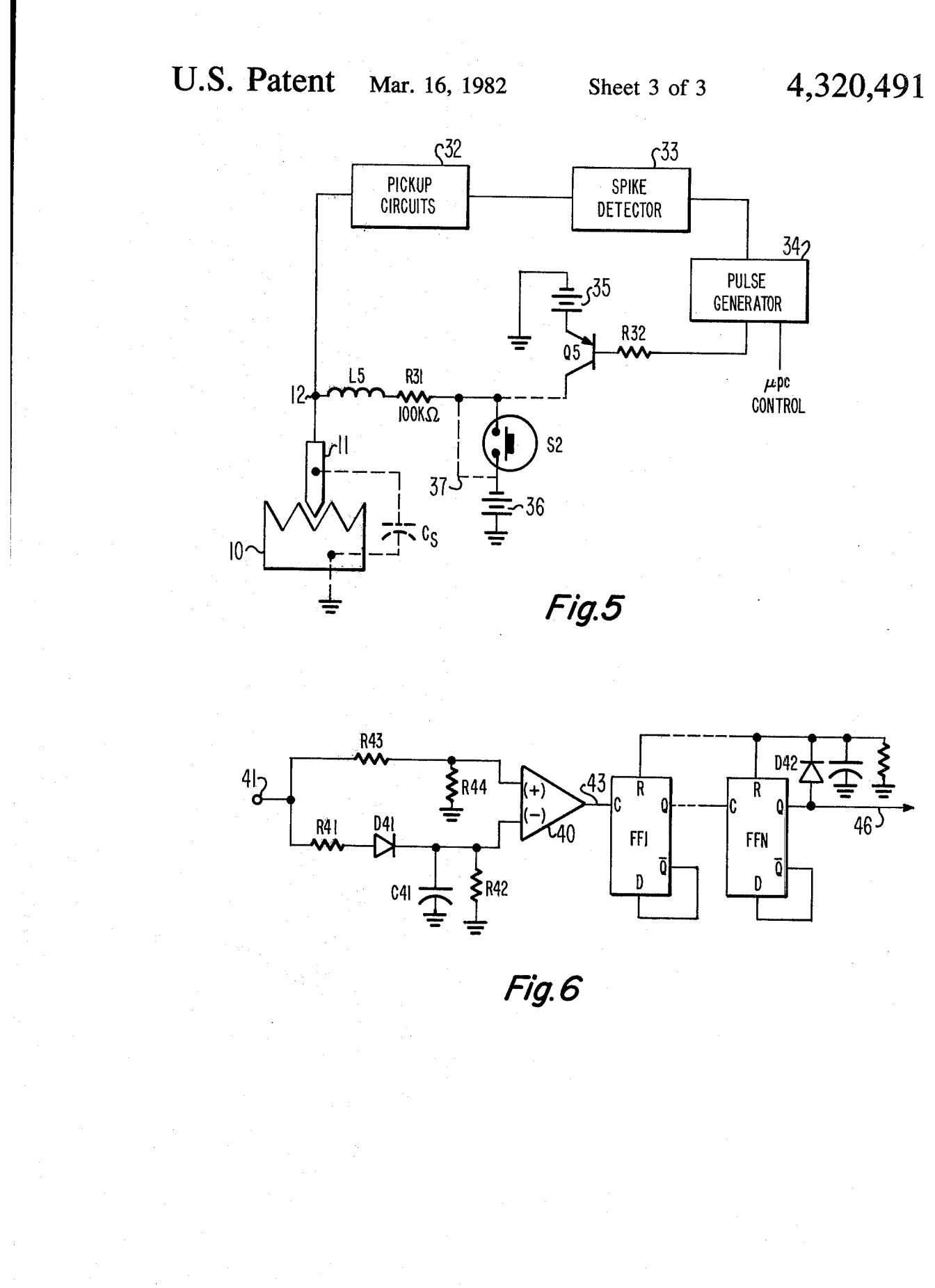

FIG. 5 illustrates circuitry for application of a dc burnback potential between the stylus electrode and the disc. A dc potential of 2-5 volts from source 36 is applied upon closure of switch S2 to electrode 11 via series inductance L5 and resistor R31. Resistor R31 limits the burnback current and the inductance L5 blocks the carrier from coupling to the supply. Preferably switch S2 is closed pre- or post-play while the stylus is on the disc. The speed of burnback is enhanced by performing the burnback on a stationary disc so that the stylus penetrates the lubricant.

Electrode burnback has also been successfully performed during playback or signal recovery by applying a continuous electrode-disc dc potential. In this case, however, the potential is reduced to about 2 volts.

An alternative to the foregoing is the automatic application of an electrode-disc potential only after the occurrence of signal spikes indicative of shorting. In this instance, the recovered signal from the signal pickup circuits 32 is monitored by spike detector circuitry 33. Responsive to the occurrence of a predetermined incidence of signal spikes, circuitry 33 produces a control signal to activate pulse generator 34. Pulse generator 34 responsive to the control signal conditions transistor Q5 to operate in saturation, thereby connecting the supply potential 35 to electrode 11. Pulse generator 34 may be a monostable multivibrator conditioned to output a single pulse of prescribed duration at the appropriate time, e.g., following completion of play. Preferably generator 34 will produce a series of short pulses to condition transistor Q5 to intermittently connect supply 35 to the stylus electrode over a prescribed time period.

FIG. 6 depicts a circuit useful for determining the occurrence of stylus electrode-disc shorts by detecting signal spikes generated thereby. The recovered signal, from connection 14 is applied at the circuit input terminal 41. The signal is divided by resistors R43 and R44 and applied to the noninverting input terminal of comparator 40. The signal is peak detected and averaged by the resistor R41, diode D41, capacitor C41, and resistor R42 combination. The average peak signal is applied to the invention input terminal of comparator 40. Resistor R41 establishes the time constant at the comparator inverting input terminal so that capacitor C41 cannot readily follow the signal spikes. As a result, the potential at the inverting input terminal is nominally more positive than the instantaneous potential at the noninverting input terminal so that the comparator output potential is normally low. A signal spike which has an amplitude larger than the average peak signal by a factor greater than the divisor of resistor divider R43, R44 will condition the potential at the noninverting terminal to exceed the potential at the inverting terminal and consequently the comparator output will go to a high level and trigger flip flop 1 (FF1). Flip flops FF1 to FFn divide the comparator "low" to "high" output transitions by the factor n and produces an output signal at terminal 46 after the occurrence of "n" signal spikes. The output signal at terminal 46 resets the divider through diode D42, thus the output signal is in the form of a pulse of short duration.

What is claimed is:

1. A record playback apparatus of the type wherein prerecorded information is recovered from a conductive disc record by a signal pickup stylus having a conductive electrode thereon and said conductive electrode is nominally electrically insulated from said disc, including means for controllably removing a portion of said electrode most nearly adjacent said conductive disc during normal disc playback by creating an electric discharge between said electrode and said disc.

2. A video disc playback combination comprising:
a signal pickup stylus arranged to engage an electrically conductive disc record, said disc having a dielectric layer on the outer surface thereof and said stylus having a conductive electrode adherent thereto, the electrode having a width W, and a length L defining an area A, the plane of the area A being generally normal to the plane of the disc record during record playback and said electrode having a thickness T which is small relative to W and L;
signal pickup circuitry connected to said electrode for sensing parametric changes between the electrode and the disc record when relative motion is created therebetween; and
means for applying a potential between the stylus electrode and the disc during record playback to cause electrical discharge therebetween creating a controlled self limiting erosion of a portion of said electrode nearest the disc when in the play position from said stylus.

3. The combination set forth in claim 2 wherein the pickup circuit comprises:
a substantially constant frequency oscillator for generating a carrier frequency signal;
a tuned reactance circuit including any capacitances occurring between the stylus electrode and the disc record, said tuned circuit conditioned to resonate at a frequency near said carrier frequency such that the carrier frequency will intercept a skirt of the amplitude frequency characteristic of said tuned circuit and wherein the resonant frequency of the tuned circuit is modulated by time varying changes in capacitance between the stylus electrode and the disc record;
means inductively coupling said carrier signal to the tuned circuit; and
a peak follower detector circuit including a diode serially connected with a parallel resistor/capacitor combination, output signal being available at an interconnection of said diode, resistor and capacitor, and further means inductively coupling the carrier signal from said tuned circuit to the serially connected diode-resistor/capacitor combination.

4. A video disc playback combination comprising:
a signal pickup stylus arranged to engage an electrically conductive disc record, said disc having a dielectric layer on the outer surface thereof and said stylus having a conductive electrode adherent thereto, the electrode having a width W, and a length L defining an area A, the plane of the area A being generally normal to the plane of the disc record during record playback and said electrode having a thickness T which is small relative to W and L;
signal pickup circuitry connected to said electrode for sensing parametric changes between the electrode and the disc record when relative motion is created therebetween including;
(a) a substantially constant frequency oscillator for generating a carrier frequency signal;
(b) a tuned reactance circuit including any capacitances occurring between the stylus electrode and the disc record, said tuned circuit conditioned to resonate at a frequency near said carrier frequency such that the carrier frequency will intercept a skirt of the amplitude frequency characteristic of said tuned circuit and wherein the resonant frequency of the tuned circuit is modulated by time varying changes in capacitance between the stylus electrode and the disc record;
(c) means inductively coupling said carrier signal to the tuned circuit; and
(d) a peak follower detector circuit including a diode serially connected with a parallel resistor/capacitor combination, output signal being available at an interconnection of said diode, resistor and capacitor, and further means inductively coupling the carrier signal from said tuned circuit to the serially connected diode-resistor/capacitor combination; and
means for conditioning said pickup circuitry tuned reactance circuit to resonate at the frequency of oscillation of said carrier frequency, thereby maximizing the potential of the signal coupled from the carrier oscillator to the stylus electrode and creating an amplitude sufficient to create a discharge between the electrode and the disc.

5. The combination set forth in claim 4 wherein the means for conditioning the pickup circuitry to resonate at the frequency of oscillation includes:
a voltage variable reactance arranged in said tuned circuit to vary the resonant frequency of the tuned circuit responsive to bias potential applied to said variable reactance;
a potential bias circuit responsive to output potential of a prescribed frequency spectrum from the detector circuit for generating a regenerative bias potential;
means selectively applying said bias potential to said voltage variable impedance means for a prescribed period when the signal pickup stylus engages a preselected portion of the disc record.

6. The combination set forth in claim 4 further including:
automatic frequency control circuitry responsive to output potential from the detector circuit and cooperating with said tuned circuit to maintain a constant relationship between the resonant frequency of the tuned circuit and the carrier signal frequency;
means for selectively conditioning said automatic frequency control circuit to operate in a regenerative mode for conditioning the tuned circuit to resonate at the carrier frequency at prescribed periods when the stylus engages the disc record.

7. The combination set forth in claims 5 or 6 wherein the voltage variable impedance means is a varactor diode in parallel connection with the stylus electrode-disc capacitance relative to said tuned circuit.

8. The combination set forth in claims 5 or 6 wherein the voltage variable impedance means is a varactor diode serially connected with the stylus electrode-disc capacitance with respect to the tuned circuit.

9. A video disc player having a signal pickup stylus with an electrode thereon, said signal pickup stylus engaging a conductive disc record for recovering prerecorded signal therefrom, said disc having a dielectric layer on its outer surfaces, said dielectric layer being intermittently breached by the disc conductive material and shorting with the stylus electrode when coming in contact therewith, said player including means for applying sufficient potential between the electrode and the conductive disc during signal recovery to generate a current therebetween, heating the electrode at the electrode disc interface and causing a portion of the electrode adjacent to the disc to evaporate thereby precluding further electrode-disc short circuits.

10. The video disc player set forth in claim 9 wherein the potential applied between the stylus electrode and disc record is a radio frequency signal and the current passing therebetween is a displacement current.

11. In combination
a conductive disc having grooves therein;
means rotatably supporting said disc;
a dielectric signal pickup stylus having a conductive electrode thereon; said electrode oriented on the stylus substantially normal to the disc for the stylus engaging the disc;
means supporting the signal pickup stylus for engaging said disc;
means for applying an electric potential between the stylus electrode and the disc during normal disc playback to cause electrical discharge therebetween creating a controlled self limiting erosion of a portion of said electrode nearest the disc when the stylus engages the disc.

* * * * *